US012568548B2

(12) United States Patent
Sung

(10) Patent No.: US 12,568,548 B2
(45) Date of Patent: Mar. 3, 2026

(54) SUPPORTING OPPORTUNISTIC RADIO RESOURCE CONTROL CONFIGURATIONS FOR RADIO ACCESS NETWORK SLICING

(71) Applicant: T-MOBILE INNOVATIONS LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 415 days.

(21) Appl. No.: 18/183,771

(22) Filed: Mar. 14, 2023

(65) Prior Publication Data
US 2024/0314878 A1     Sep. 19, 2024

(51) Int. Cl.
H04W 36/08     (2009.01)
H04L 1/00     (2006.01)
H04W 76/20     (2018.01)

(52) U.S. Cl.
CPC ........... *H04W 76/20* (2018.02); *H04L 1/0026* (2013.01); *H04W 36/08* (2013.01)

(58) Field of Classification Search
CPC ..... H04W 76/20; H04W 36/08; H04W 76/27; H04L 1/0026
See application file for complete search history.

(56) References Cited

U.S. PATENT DOCUMENTS

2018/0124784 A1*  5/2018  Kumar .............. H04W 52/0206
2020/0145889 A1*  5/2020  Yamada .......... H04W 36/00838

FOREIGN PATENT DOCUMENTS

CN          114271005 A     4/2022

* cited by examiner

*Primary Examiner* — Shukri Taha
(74) *Attorney, Agent, or Firm* — SHOOK, HARDY & BACON L.L.P.

(57)          ABSTRACT

The technology disclosed herein relates to a radio resource control (RRC) controller of an RRC component in a central unit of a telecommunications network (e.g., 4G, 5G, 6G, another generation communication system, or one or more combinations thereof) for providing telecommunication services to user devices via network slicing. The RRC controller can receive radio access network (RAN) usage data (e.g., a time-averaged channel quality indicator) for a serving cell or component carriers corresponding to a base station. In addition, the RRC controller can determine a carrier aggregation configuration for a user device or use case based on the RAN usage data. In embodiments, the RRC controller determines a serving cell for the user device or use case based on the RAN usage data. Further, the RRC controller can provide the carrier aggregation configuration or the determined serving cell to a medium access control (MAC) scheduler.

17 Claims, 5 Drawing Sheets

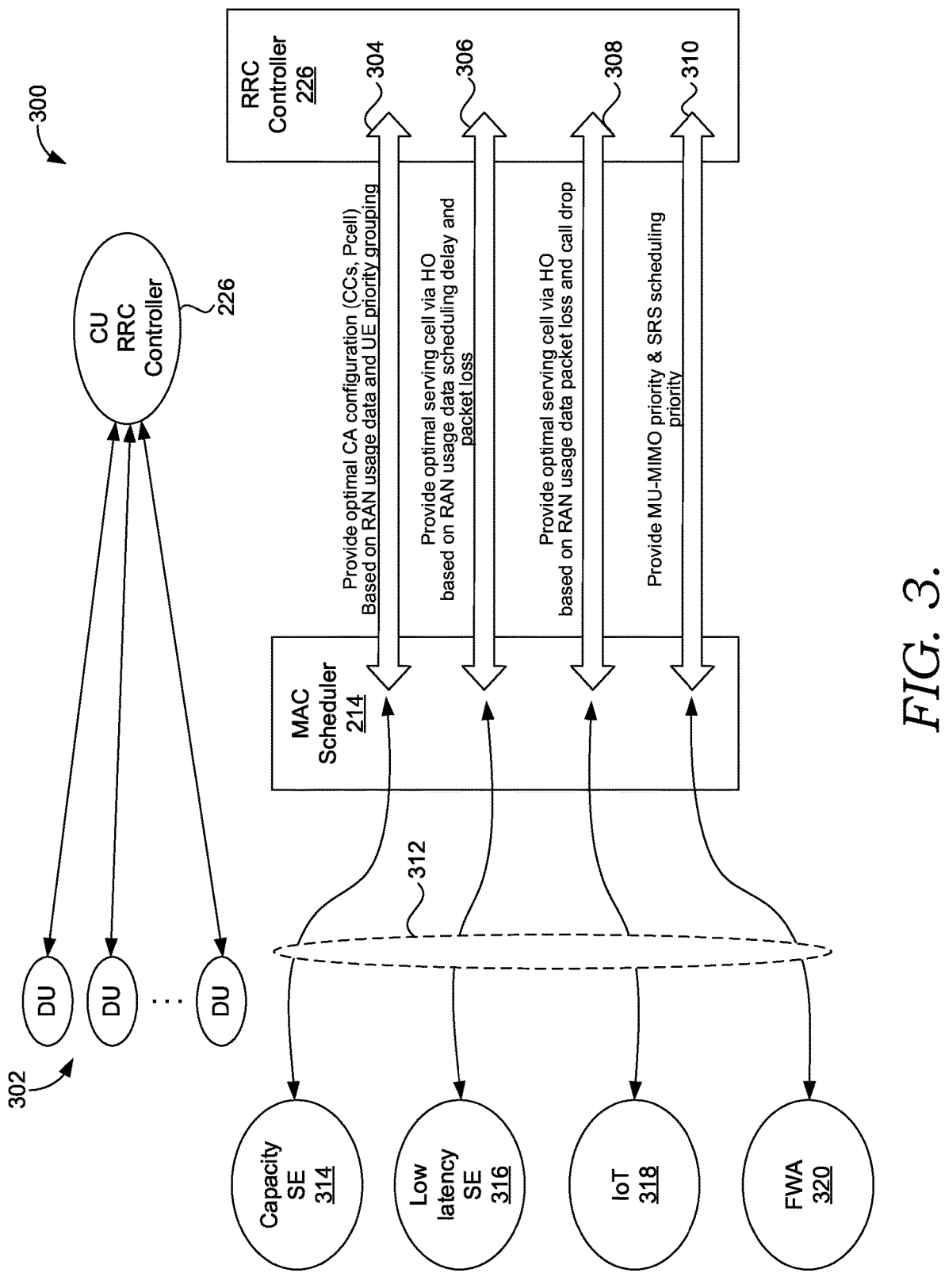

300

CU
RRC
Controller     226

302

DU  DU  ... DU

RRC
Controller  226

304  Provide optimal CA configuration (CCs, Pcell) Based on RAN usage data and UE priority grouping 306  Provide optimal serving cell via HO based on RAN usage data scheduling delay and packet loss 308  Provide optimal serving cell via HO based on RAN usage data packet loss and call drop 310  Provide MU-MIMO priority & SRS scheduling priority MAC
Scheduler  214

312

Capacity
SE  314

Low
latency
SE  316

IoT  318

FWA  320

FIG. 3.

SUPPORTING OPPORTUNISTIC RADIO RESOURCE CONTROL CONFIGURATIONS FOR RADIO ACCESS NETWORK SLICING

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with positioning precision and techniques for supporting opportunistic radio resource control (RRC) configurations for radio access network (RAN) slicing, substantially as shown in and/or described in connection with at least one of the figures, and as set forth more completely in the claims. For example, an RRC controller provides various functions and operations for improved RAN slicing by directly providing a medium access control (MAC) scheduler instructions without having to utilize another network component of a central unit or another network component of a distributed unit.

In aspects set forth herein, and at a high level, the technology described herein relates to RRC controller of an RRC component in a central unit of a telecommunications network (e.g., 4G, 5G, 6G, another generation communication system, or one or more combinations thereof) for providing telecommunication services to user devices via network slicing. The RRC controller can receive RAN usage data (e.g., a time-averaged channel quality indicator, a quality of service class identifier, a packet loss, a resource usage, a scheduling delay, a call drop rate) for a serving cell, component carriers, or one or more combinations thereof, corresponding to a base station. For example, RAN usage data can correspond to a first component carrier associated with a first telecommunication service provider and a second component carrier associated with a second telecommunication service provider. In embodiments, a group of component carriers can include downlink carriers, and another group of component carriers can include at least one downlink carrier.

In addition, the RRC controller can determine a carrier aggregation configuration for a user device or use case based on the RAN usage data. For example, two to five component carriers can be aggregated for transmission bandwidths up to 100 MHz. In some aspects of this embodiment, each of the aggregated component carriers may have a different bandwidth. In another embodiment, two to thirty two component carriers can be aggregated for transmission bandwidths up to 640 MHz. Other embodiments can be contemplated. In embodiments, the RRC controller can determine additional carrier aggregation configurations for other user devices using other telecommunication service providers based on the RAN usage data. Additionally, in embodiments, the RRC controller determines a serving cell, of a plurality of serving cells (e.g., a plurality of base stations having neighboring coverage areas), for the user device or use case based on the RAN usage data. The RRC controller can also determine a multi-user multiple-input multiple-output (MU-MIMO) priority and a sounding reference signal (SRS) scheduling priority for the at least one user device based on the user device priority groupings and the RAN usage data. The RRC controller can also determine one or more handover procedures, paging configurations, or one or more combinations thereof, for a user device based on the RAN usage data.

Further, the RRC controller can provide one or more of the carrier aggregation configuration, the determined serving cell, MU-MIMO priority, SRS scheduling priority, handover procedure, paging configuration, or one or more combinations thereof, to the MAC scheduler. In embodiments, the RRC controller can receive additional RAN usage data based on providing the carrier aggregation configuration, the determined serving cell, MU-MIMO priority, SRS scheduling priority, handover procedure, paging configuration, or one or more combinations thereof, to the MAC scheduler.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 3 depicts an example operational functions of the RRC controller, in accordance with embodiments herein;

DETAILED DESCRIPTION

Figure 1:
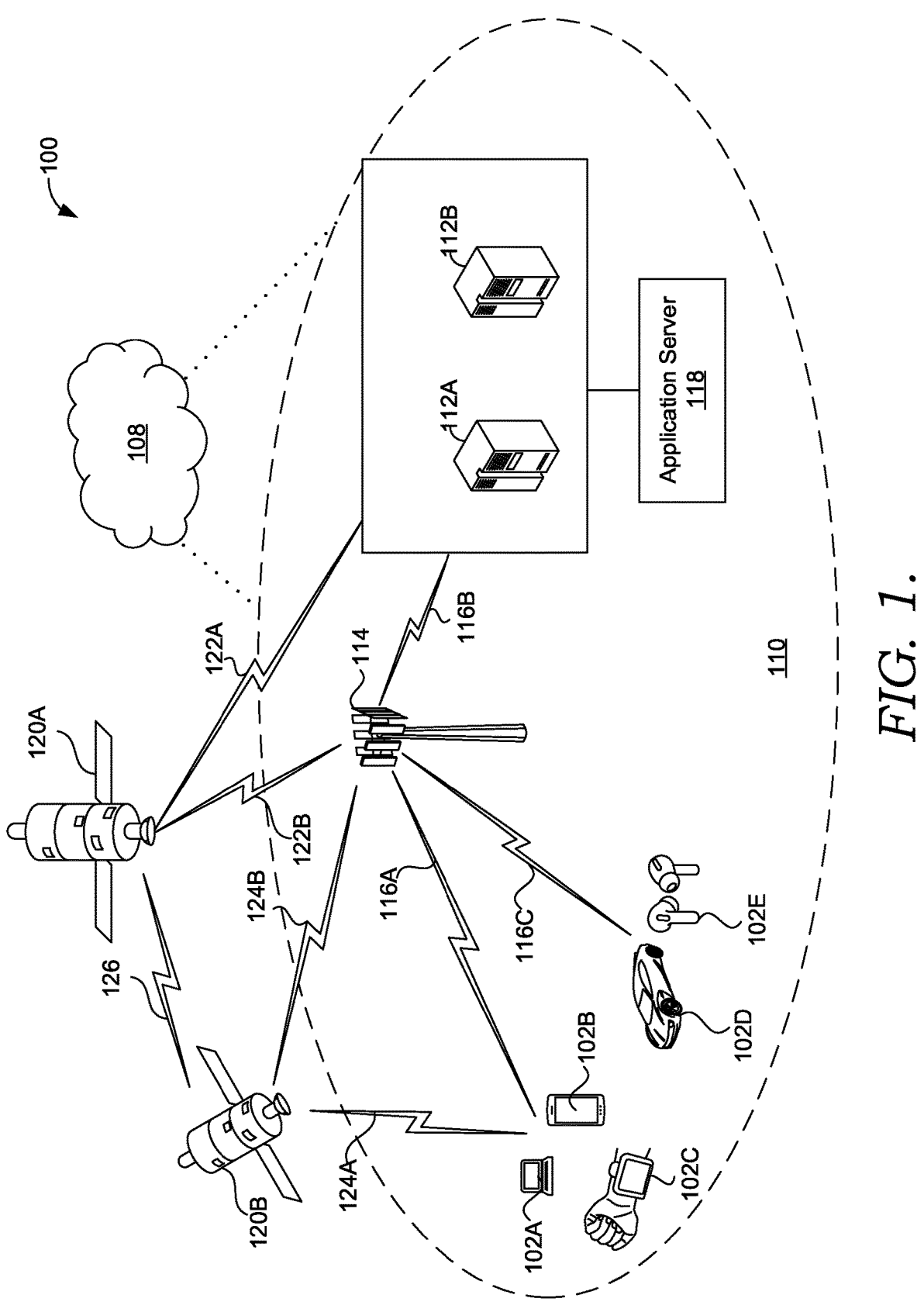
FIG. 1 depicts an example operating environment for a radio resource control (RRC) controller, in accordance with embodiments herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs
EEPROM Electrically Erasable Programmable Read
   Only Memory
E-UTRA Evolved Universal Terrestrial Radio Access
FD-MIMO Full-Dimension Multiple-Input Multiple-Out-
   put
FDD Frequency Division Duplex
GPS Global Positioning System
IoT Internet of Things
KPI Key Performance Indicator
LAN Local Area Network
LTE Long Term Evolution
MAC Medium Access Control
MIMO Multiple-Input Multiple-Output
mm Wave Millimeter waves
MU-MIMO Multi-User Multiple-Input Multiple-Output
NR New Radio
PC Personal Computer
PDA Personal Digital Assistant
PDCCH Physical Downlink Control Channel
PDSCH Physical Downlink Shared Channel
PUSCH Physical Uplink Shared Channel
QoS Quality of Service
QCI Quality of Service Class Identifier
RAM Random Access Memory
RAN Radio Access Network
RF Radio-Frequency
ROM Read Only Memory
RRC Radio Resource Control
RSRP Reference Signal Received Power
RSRQ Reference Signal Received Quality
RSSI Received Signal Strength Indicator
SNR Signal-to-Noise Ratio
SRS Sound Reference Signal
TDD Time Division Duplex
TDMA Time Division Multiple Access
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

The RRC controller, systems including the RRC controller, and the associated methods and techniques disclosed herein relate to enhanced operations for providing telecommunication services to user devices in one or more communication systems (e.g., 4G, 5G, 6G, another generation communication system, or one or more combinations thereof) via network slicing. Network slicing relates to the parameters assigned for user devices or use cases of a "slice" of a network. For example, a network slice is associated with the splitting of resources along a data path into sets, which are optimized for certain user devices or use cases. To illustrate, network slicing can be used to create a slice for an autonomous vehicle service having particular quality of service parameters and resource allocation. As another example, a slice of the network can be used for IoT devices and another slice can be used for particular smartphone applications. As discussed in further detail herein, the technology disclosed provides various improvements to network slicing architecture and network slicing performance, resource utilization, and flexibility.

A "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 102A-102E described herein with respect to FIG. 1.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof. In some aspects, the user device is a wearable device having a camera, microphone, RFID, GPS, another sensor, or one or more combinations thereof, to capture data in real-time or near real-time (e.g., one or more strings of text, image data, video data, audio data, location data, other types of data, or one or more combinations thereof).

The wearable devices and other user devices, for example, can transmit the data obtained by their corresponding sensors to other user devices. For example, the sensor data obtained by a user device can be further transmitted for another user device to perform positional tracking (e.g., six degrees of freedom positional tracking) associated with the user device capturing the sensor data in real-time. In embodiments, a user device can access sensors, application data, tracking data, map data, other user device data, or one or more combinations thereof, for packet transmissions to a user device. In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Wireless telecommunication services" refer to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mmWave communication, and mobile communication. Embodiments of the present technology may be used with different wireless telecommunication technologies or standards, including, but not limited to, CDMA 1xAdvanced, GPRS, Ev-DO, TDMA, GSM, WiMAX technology, LTE, LTE Advanced, other technologies and standards, or one or more combinations thereof.

A "network" providing the telecommunication services (e.g., network 108 of FIG. 1) may be one or more telecommunications networks, or a portion thereof. The telecommunications network might include an array of devices or components (e.g., one or more base stations). The network can include multiple networks, and the network can be a network of networks. In embodiments, the network or a portion thereof is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service (e.g., voice over RN), a message service (e.g., SMS messages, MMS messages, instant messaging messages, an EMS service messages), a video service (e.g., video over NR), a data service, other types of wireless telecommunication services, or one or more combinations thereof, to user devices or corresponding users that are registered or subscribed to a telecommunication service provider to utilize the one or more services. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the telecommunications network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like. A base station may be, in an embodiment, similar to base station 114 described herein with respect to FIG. 1.

For example, the base station may refer to a base transceiver station, a radio base station, an access point, a radio transceiver, a NodeB, an eNB, a gNB, a Home NodeB, a Home eNodeB, another type base station, or one or more combinations thereof. A node corresponding to the base station may comprise one or more of a macro base station, a small cell or femtocell base station, a relay base station, another type of base station, or one or more combinations thereof. In aspects, the base station may be configured as FD-MIMO, massive MIMO, MU-MIMO, cooperative MIMO, 3G, 4G, 5G, another generation communication system, or one or more combinations thereof. In addition, the base station may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer storage media and communications media.

Computer storage media, or machine-readable media, include media implemented in any method or technology for storing information. Examples of stored information include computer-useable instructions, data structures, program modules, and other data representations. Computer storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with providing particular information to network components that assign bandwidth resources to user devices and uplink or downlink channel instructions to network nodes, such as a MAC scheduler. For example, the RRC component in the central unit of telecommunications networks of the prior relevant technologies have not provided this particular information to the MAC scheduler. Without providing this particular information to the MAC controller, user devices receiving telecommunication services can experience blocked or delayed communications, interference, limited data throughput, or one or more combinations thereof.

The technology provided herein can alleviate the problems discussed above. For example, the technology disclosed herein improves user experiences corresponding to user devices and telecommunications services provided by telecommunications service providers by reducing blocked or delayed communications and reducing interferences. In addition, the technology disclosed herein can lower latency corresponding to spectrum efficiency, increase capacity corresponding to spectrum efficiency, and provide improved user experiences via providing instructions and signals (determined using the RRC controller) to particular user devices (e.g., IoT user devices and FWA devices). In an embodiment, a radio resource control (RRC) controller for network slicing is provided. The RRC controller comprises one or more processors and computer memory storing computer-usable instructions that, when executed by the one or more processors, cause the RRC controller to perform operations. The operations comprise receiving, via the RRC controller, radio access network (RAN) usage data for a plurality of component carriers corresponding to a base station. The operations also comprise determining, via the RRC controller, a carrier aggregation configuration for at least one user device or use case based on the RAN usage data. The operations also comprise providing, via the RRC controller, the carrier aggregation configuration to a medium access control (MAC) scheduler. The RRC controller can directly provide the MAC scheduler one or more determinations, without having to utilize other network components (e.g., another network component of the central unit or another network component of the distributed unit of the network (e.g., a core network)).

In another embodiment, a method is provided for utilizing a radio resource control (RRC) controller for network slicing. The method comprises receiving, via the RRC controller, radio access network (RAN) usage data for component carriers corresponding to a base station. The method also comprises determining, via the RRC controller, a carrier aggregation configuration for a user device based on the RAN usage data. The method also comprises determining, via the RRC controller, at least one serving cell, corresponding to the base station, for the user device based on the RAN usage data. The method also comprises providing, via the RRC controller, the carrier aggregation configuration and the at least one serving cell to a medium access control (MAC) scheduler for the user device.

Another embodiment includes one or more non-transitory computer storage media having computer-executable instructions embodied thereon, that when executed by at least one processor, cause the at least one processor to perform a method. The method comprises receiving, via the RRC controller, radio access network (RAN) usage data for component carriers corresponding to a plurality of serving cells (e.g., each associated with a base station). The method also comprises receiving, via the RRC controller, location data for a user device. The method also comprises determining, via the RRC controller, a serving cell of the plurality of serving cells for the user device based on the RAN usage data and the location data. The method also comprises determining, via the RRC controller, a carrier aggregation configuration for the user device based on the serving cell, the RAN usage data, and the location data. The method also comprises causing the RRC controller to provide the carrier aggregation configuration and the serving cell to a medium access control (MAC) scheduler for the user device.

Those skilled in the art will appreciate that the computing devices described herein need not be limited to conventional personal computers, and can include other computing configurations, including servers, hand-held devices, multi-processor systems, a microprocessor based or programmable consumer electronics, network PCs, minicomputers, mainframe computers, other computing devices, or one or more combinations thereof. Similarly, the computing devices need not be limited to stand-alone computing devices, as the mechanisms may also be practiced in distributed computing environments where tasks are performed by remote processing devices that are linked through a wireless telecommunications network. In a distributed computing environment, program modules may be located in both local and remote memory storage devices.

Turning now to FIG. 1, example operating environment 100 for the RRC controller is illustrated, in accordance with one or more embodiments disclosed herein. Example operating environment 100 is but one example of a suitable environment for the RRC controller disclosed herein, and is not intended to suggest any limitation as to the scope of use or functionality of the disclosed technology. Neither should the environment 100 be interpreted as having any dependency or requirement relating to any one or combination of components illustrated.

Example environment 100 includes user devices 102A-102E, network 108, coverage area 110, network components 112A-112B, base station 114, terrestrial communication links 116A-116C associated with the base station 114, application server 118, satellites 120A and 120B, communication links 122A and 122B associated with satellite 120A, communication links 124A and 124B associated with satellite 120B, and communication link 126 between satellites 120A and 120B. Other embodiments may include other base stations, other user devices, other satellites, multiple application servers, and so forth.

Example operating environment 100 having network 108 and coverage area 110 may be associated with one or more of a non-terrestrial network, an LTE network, an LTE-A network, an LTE-A Pro network, an NR network, an mmWave network, another type of network, or one or more combinations thereof. In some embodiments, the example environment 100 may support enhanced broadband communications, ultra-reliable (e.g., mission critical) communications, low latency communications, communications with low-cost and low-complexity devices, another type of communication, or one or more combinations thereof. In some embodiments, one or more communications received or transmitted by the user devices 102A-102E may correspond to the enhanced broadband communication, ultra-reliable communication, low latency communication, another type of communication, the non-terrestrial network, the LTE network, the LTE-A network, the LTE-A Pro network, the NR network, the mmwave network, another type of network, or one or more combinations thereof.

In embodiments, example operating environment 100 can utilize both licensed and unlicensed radio frequency bands. For example, the example operating environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, one or more of the communications received or transmitted by the user devices 102A-102E may correspond to a licensed or unlicensed radio frequency band, a 5 GHz industrial band, a 5 GHz scientific band, a 5 GHz medical band, a particular carrier aggregation configuration of a licensed band, a P2P transmission, a D2D transmission, another type of spectrum operation, or one or more combinations thereof.

In embodiments, user devices 102A-102E may wirelessly communicate via one or more wireless telecommunication services provided by one or more base stations (e.g., base station 114), one or more satellites (e.g., satellites 120A and 120B), other types of wireless telecommunication devices, or one or more combinations thereof. In example environment 100, network 108, base station 114, and satellites 120A-120B can provide coverage area 110 for supporting communication signals according to one or more radio access technologies. Supported communication signals within coverage area 110 can include MU-MIMO and SU-MIMO transmissions, for example. As such, one or more of the communications received or transmitted by the user devices 102A-102E may correspond to the wireless telecommunication services provided within coverage area 110.

In embodiments, the user devices 102A-102E can be stationary, mobile, or one or more combinations thereof at different times. The user devices 102A-102E may be able to communicate with various types of devices, such as other UEs, various types of base stations, or various types of network equipment (e.g., core network nodes, relay devices, integrated access and backhaul nodes, other network equipment, or one or more combinations thereof). In embodiments, one or more of the user devices 102A-102E may have different capabilities. For example, as illustrated in example environment 100, user devices 102D and 102E can be devices in different forms or devices having different capabilities. Continuing this example, user devices 102C and 102E can be wearable devices having a camera, microphone, RFID, GPS, another sensor, or one or more combinations thereof. In some embodiments, one or more of user devices 102A-102E can capture data in real-time or near real-time (e.g., one or more strings of text, image data, video data, acoustic data including soundwave data, location data, other types of data, or one or more combinations thereof).

In embodiments, one or more of the user devices 102A-102E may include one or more of a unit, a station, a terminal, or a client, for example. The user devices 102A-102E may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, a user device may be implemented in various objects such as appliances, vehicles, meters, or other objects. In some embodiments, one or more of the user devices 102A-102E may, at one time or another, act as a relay, base station, (e.g., a UAV acting as an aerial base station), or the network components (e.g., macro eNBs or gNBs, small cell eNBs or gNBs, or relay base stations).

Coverage area 110 can provide services from network 108, such as telecommunications network provider services including the Internet, Intranet, Internet Protocol Multimedia Subsystem, Packet-Switched Streaming Service, another type of network provider service, or one or more combinations thereof. Coverage area 110 can provide network services of a plurality of telecommunication providers. In embodiments, coverage area 110 can include a serving cell (a set of one or more cells comprising a primary cell and secondary cells) associated with one or more frequency bands. In embodiments, the serving cell associated with the coverage area 110 can be neighboring one or more neighboring serving cell associated with other coverage areas or overlapping coverage areas. User devices 102A-102E camped on a serving cell can be in a connected mode or idle mode while located within a portion of coverage area 110. Further, coverage area 110 can correspond to a geographical area covered by base station 114, satellite 120A, satellite 120B, another network access node, or one or more combinations thereof. In addition, the serving cell of the coverage area 110 can be associated with a specific network provider, frequency band, or radio access technology.

Coverage area 110 can be communicatively coupled to network 108, which may have a plurality of network components 112A-112B. Network components 112A-112B can be configured to provide telecommunication services associated with telecommunication service providers to user devices 102A-102E located within coverage area 110. The network components 112A-112B can be implemented in a physical node or physical nodes having components to read and execute computer-usable instructions from computer memory. In embodiments, the network 108 includes a core network having network slices that enable multiple virtual networks on a single physical networking infrastructure. For example, a network slice can represent an independent virtualized instance by allocating a subset of core network resources. The network slice can have a set of virtual resources and telecommunication traffic flows. In addition, network components 112A-112B can include one or more application servers 118 that implement core network elements or application functions. The network components 112A-112B also include an RRC controller in an RRC component of the central unit of network 108, the RRC controller being configured to communicate with a MAC scheduler of MAC component of the distributed unit of the network 108. For example, the RRC controller can directly communicate with the MAC scheduler without having to utilize other network components (e.g., another network component of the central unit or another network component of the distributed unit).

The application server 118 can have one or more physical systems, one or more virtualized systems, or one or more combinations thereof, for providing operational instructions or services to user devices 102A-102E. The application server 118 may include one or more computing devices with one or more rack computing architecture components, tower computing architecture components, blade computing architecture components, other architecture components, or one or more combinations thereof. In embodiments, the application server 118 may be a cluster of servers, a server farm, a cloud computing service, another grouping or pool of servers, or one or more combinations thereof, which may be located in one or more datacenters. The application server 118 may also be connected to, or otherwise associated with one or more data storage devices. Additionally, the application server 118 can offer applications or services that use resources of network 108. The application server 118 can also support one or more telecommunication services (e.g., Voice-over-Internet Protocol sessions, push-to-talk sessions, group communication sessions, social networking services) for the user devices 102A-102E via the network 108. The application server 118 can be configured to communicate with the RRC controller in the RRC component of the central unit of network 108.

Base station 114 and satellites 120A-120B may communicate with the wireless telecommunications network 108 via a core network, one or more components (e.g., a core network node, a relay device, an integrated access and backhaul node, a macro eNB, a small cell eNB, a gNB, a relay base station), or one or more combinations thereof. In some embodiments, the base station 114, satellite 120A, or satellite 120B, communicates with the wireless telecommunications network 108 over one or more backhaul links (e.g., via an X2, Xn, or other interface) either directly (e.g., directly between base stations), or indirectly (e.g., via core network), or one or more combinations thereof. The backhaul links may be or include one or more wireless links, for example. Further, the base station 114 and satellites 120A-120B may communicate with the RRC controller in the RRC component of the central unit of network 108, with application server 118, or one or more combinations thereof. Additionally, the base station 114 and satellites 120A-120B may receive instructions from the MAC scheduler, which were received from the RRC controller.

In embodiments, base station 114 may operate using MIMO transmissions. For example, the base station 114 can be configured as FD-MIMO, massive MIMO, MU-MIMO, cooperative MIMO, 3G, 4G, 5G, another generation communication system, or one or more combinations thereof, for providing telecommunication services to one or more of user devices 102A-102E. The base station 114 can perform one or more of the following functions: transfer user data, radio channel ciphering and deciphering, integrity protection, header compression, mobility control functions (e.g., handover, dual connectivity), inter-cell interference coordination, connection setup and release, load balancing, distribution for non-access stratum messages, Non-Access Stratum node selection, synchronization, radio access network sharing, multimedia broadcast multicast service, subscriber and equipment trace, radio access network information management, paging, positioning, delivery of warning messages, other functions, or one or more combinations thereof. In embodiments, one or more processors of the RRC controller make determinations based on or associated with the functions performed by base station 114.

In some embodiments, one or more base station antennas or antenna arrays of base station 114 may be co-located at an antenna assembly, such as an antenna tower. In some examples, antennas or antenna arrays associated with base station 114 may be located in diverse geographic locations. In some aspects, one or more nodes corresponding to base station 114 may comprise one or more macro cells, one or more small cells, one or more relay base stations, one or more repeaters, one or more femtocells, other types of cells, or one or more combinations thereof. In some embodiments, base station 114 may be movable and therefore provide communication coverage for a moving geographic coverage area 110. Further, terrestrial communication links 116A-116C may use MIMO antenna technology, including spatial multiplexing, beamforming, transmit diversity, other MIMO functions, or one or more combinations thereof. Communication links 116A-116C may be through one or more component carriers. In embodiments, the component carriers of one or more of communication links 116A-116C can correspond to one or more different telecommunication service providers. In embodiments, one or more processors of the RRC controller make determinations based on or associated with the an antenna assembly of the base station 114, the type of base station (e.g., macro cell, femtocell), spatial multiplexing, beamforming, transmit diversity, other MIMO functions, or one or more combinations thereof.

Satellites 120A-120B may communicate with base station 114, user devices 102A-102E, other high altitude or terrestrial communications devices, the network components 112A-112B, or one or more combinations thereof. "Satellite" may also be referred to as a space vehicle or communication satellite. Satellites 120A-120B may be any suitable type of communication satellite configured to relay communications between different end nodes in a wireless communication system. Satellites 120A-120B may be or include a space satellite, a balloon, a dirigible, an airplane, a drone, an unmanned aerial vehicle, another type of satellite, or one or more combinations thereof. In some examples, the satellites 120A-120B may be in a geosynchronous or geostationary earth orbit, a low earth orbit, a medium earth orbit, another type of orbit, or one or more combinations thereof. In some embodiments, satellites 120A-120B may be a multi-beam satellite configured to provide service for multiple service beam coverage areas in a predefined geographical service area (e.g., coverage area 110). The satellites 120A-120B may be any distance away from the surface of the earth. In embodiments, one or more processors of the RRC controller make determinations based on or associated with the type of satellite (e.g., space satellite, balloon, dirigible) or the positioning of the satellite (e.g., low earth orbit, medium earth orbit).

In some embodiments, satellites 120A-120B may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication link 126 may include a free space optical link, a microwave link, electromagnetic wave signals via mmWaves, optical signals via a laser, another type of communication link, or one or more combinations thereof. In embodiments, satellites 120A-120B may be configured to communicate via a wireless common public radio interface protocol, a dedicated wireless front haul protocol developed for high-altitude-to-high-altitude, another protocol, or one or more combinations thereof. In embodiments, one or more processors of the RRC controller make determinations based on or associated with wind speeds or turbulence of one or more of satellites 120A-120B, link data corresponding to communication link 126 (e.g., free space optical link data, microwave link data), the wireless common public radio interface protocol, the dedicated wireless front haul protocol, another protocol, or one or more combinations thereof.

In some embodiments, one or more portions of coverage area 110 may be provided or established by satellites 120A-120B as part of a non-terrestrial network. Satellites 120A-120B may, in some cases, perform the functions of base station 114 or may act as a bent-pipe satellite, act as a regenerative satellite, act as another type of satellite, or one or more combinations thereof. In other cases, satellites 120A-120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base station 114) and transmit those signals to different ground base stations (e.g., via communication links 122B, 124B). In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa. In embodiments, one or more processors of the RRC controller make determinations based on or associated with the particular algorithms beyond those used in regenerative satellites, communication links 122A, 122B, 124A, 124B, amplified signals or shift from the uplink frequencies to downlink frequencies, demodulated signals, decoded signals, re-encoded signals, modulated signals, or one or more combinations thereof.

User devices 102A-102E may communicate with satellites 120A-120B using communications links 122A or 124A. In embodiments, base station 114 can communicate with satellites 120A-120B using communication links 122B and 124B. In some embodiments, timing adjustments may be used to account for propagation delays associated with communications links 122A and 124A. In embodiments, one or more processors of the RRC controller make determinations based on or associated with timing adjustments associated with one or more of communication links 122A, 122B, 124A, 124B, propagation delays associated with one or more of communication links 122A, 122B, 124A, 124B, user device communications with satellite 120A, user device communications with satellite 120B, user device communications with base station 114, base station 114 communications with satellite 120A, base station 114 communications with satellite 120B, one or more of network component 112A-112B communications, or one or more combinations thereof.

Figure 2:
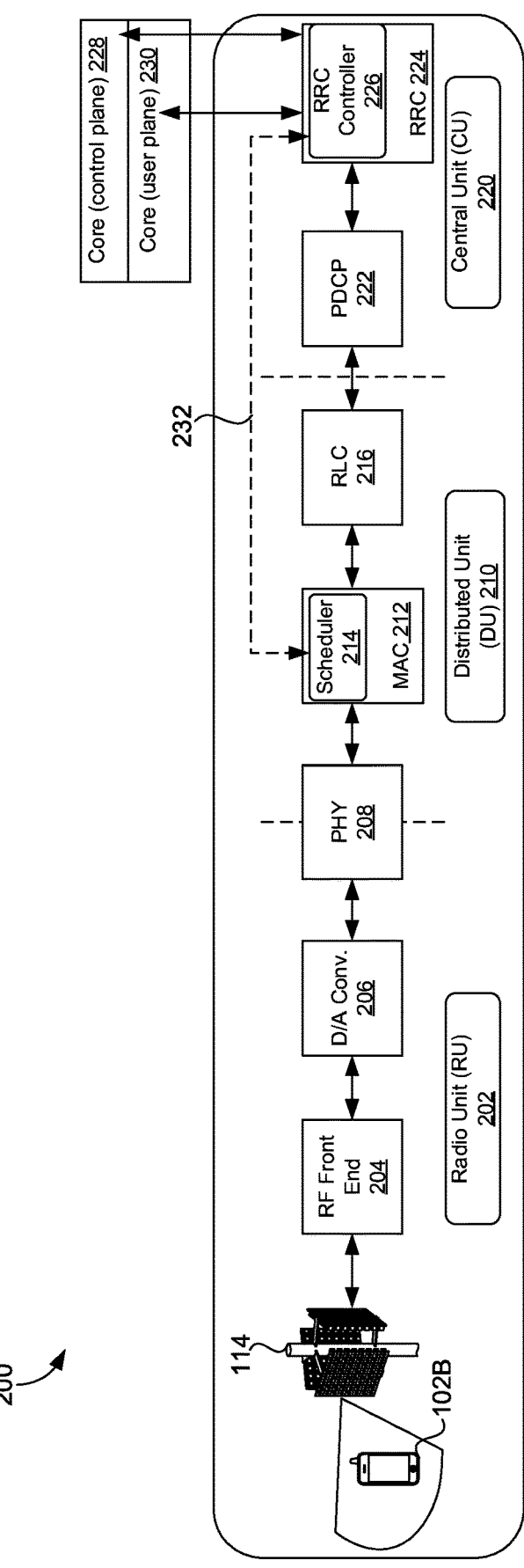
FIG. 2 depicts an example telecommunications network environment for the RRC controller, in accordance with embodiments herein.

FIG. 2 depicts an example telecommunications network environment 200 for the RRC controller 226. Example telecommunications network environment 200 includes user device 102B, base station 114, and network components. For example, the network components include radio unit 202 having radio frequency front end 204 and digital/analog converter 206. Further, distributed unit 210 has physical layer 208, MAC 212 having the MAC scheduler 214, and radio link control 216. Further, the central unit 220 has packet data convergence protocol 222 and RRC component 224, which has RRC controller 226 that communicates with core control plane 228, core user plane 230, and the MAC scheduler 214 via communication link 232. Example telecommunications network environment 200 is but one example of a suitable environment for the RRC controller 226 disclosed herein. For example, other embodiments of telecommunication network environments can include additional core network components, additional user devices, additional base stations, other types of network components, or one or more combinations thereof.

As illustrated in example telecommunications network environment 200, the RRC controller 226 can directly provide the MAC scheduler 214 of the MAC 212 and distributed unit 210 one or more determinations or other types of information or signals via communication link 232 without having to utilize another network component (e.g., such as a network component of the central unit 220 or the distributed unit 210). As illustrated in example telecommunications network environment 200, the RRC controller 226 can also receive information or signals from the MAC scheduler 214 (e.g., in response to providing the MAC scheduler 214 with a determined carrier aggregation configuration).

In embodiments, the RRC controller 226 determines a carrier aggregation configuration based on RAN usage data received from user device 102B, base station 114, packet data convergence protocol 222, core control plane 228, core user plane 230, MAC scheduler 214, or one or more combinations thereof. In some embodiments, the RRC controller determines the carrier aggregation configuration in non-real time (e.g., about 10 milliseconds to about 100 milliseconds). RAN usage data can include a channel quality indicator and RAN usage statistics of the channel quality indicator, such as an average channel quality indicator or a time-averaged channel quality indicator. Additionally or alternatively, RAN usage data can include a quality of service class identifier (e.g., a QCI defining signal configurations for the physical layer 208). Additionally or alternatively, RAN usage data can include packet loss (e.g., a number of transmitted packets that were not received) or packet loss rate (e.g., a ratio of a number of packets lost to a total number of packets transmitted). Additionally or alternatively, RAN usage data can include resource usage data, such as user device traffic data within a particular portion of a coverage area, a number of Wi-Fi access nodes within the particular portion of the coverage area, or an available amount of storage resources associated with the network (e.g., a storage resource that the RRC controller has access to). Additionally or alternatively, RAN usage data can include a scheduling delay (e.g., a scheduling delay for an uplink received by the base station 114 or a downlink transmitted to user device 102B). Additionally or alternatively, RAN usage data can include a call drop rate (e.g., corresponding to a primary component carrier, a secondary component carrier, another type of carrier, or one or more combinations thereof).

In some embodiments, the RRC controller 226 determines the carrier aggregation configuration based on a time-averaged channel quality indicator and one or more user device priority groupings. In some embodiments, the RRC controller 226 determines the carrier aggregation configuration based on CQIs received from a plurality of user device and the user device priority groupings of the plurality of user devices. For example, the user device priority grouping may be based on some of the plurality of user devices having a higher priority than other user devices. In some embodiments, the higher priority can be based on a type of the user device (e.g., an IoT user device having a higher priority than a non-IoT user device). In some embodiments, the user device priority grouping is based on a service subscription (e.g., a unified data management service, a policy control function service, an access and mobility management function).

Further, the RRC controller 226 determines the number of component carriers for the carrier aggregation configuration. For example, the RRC controller 226 can determine whether two, three, four, or five component carriers will be aggregated, as well as determining the bandwidth (e.g., up to 100 MHz). As another example, the RRC controller 226 can determine whether one or more of the component carriers have different bandwidths using the RAN usage data, the one or more user device priority groupings, user device location data, co-channel interference data associated with serving cell access nodes of one or more base stations or satellites transmitting downlink signals to user devices, or one or more combinations thereof. In yet another example, the RRC controller 226 can determine whether two to thirty two component carriers will be aggregated and the transmission bandwidth (e.g., up to 640 MHz). Further, the RRC controller 226 can determine the primary component carrier (carrying all common and user device specific control channels in a licensed or unlicensed frequency band), the one or more secondary carriers, other types of carriers, or one or more combinations thereof.

In some embodiments, the primary component carrier can be determined based on based on comparing one or more of the RAN usage data of the primary component carrier with the RAN usage data of a plurality of component carriers. For example, the primary component carrier may be determined based on the corresponding call drop rate being lower than the other primary component carriers. In some aspects, the other primary component carriers correspond to different serving cells. In some embodiments, the carrier aggregation configuration can be based on comparing one or more of the RAN usage data for a component carrier to a threshold. For example, the primary component carrier can be determined based on the time-averaged channel quality indicator of the primary component carrier being compared to a threshold. In some embodiments, one or more second component carriers can be determined based on a corresponding packet loss being below a threshold. In some embodiments, the carrier aggregation configuration can be determined based on one or more scheduling delays being below a threshold.

Turning to FIG. 3, example environment 300 illustrates example operational functions of the RRC controller 226. Example environment 300 includes central unit RRC controller 226, which is configured to communicate with a plurality of distributed units 302. In embodiments, each of the plurality of distributed units 302 have a MAC scheduler 214, and the RRC controller is configured to communicate with each of the MAC schedulers of each of the distributed units 302. In some embodiments, each of the distributed units 302 correspond to a different serving cell associated with one or more base stations, satellites, or one or more combinations thereof. Example environment 300 is but one example of a suitable environment for the RRC controller 226 disclosed herein.

As illustrated in example environment 300, at 304, the RRC controller 226 can provide one or more CA configurations to a MAC scheduler 214, without having to use another network component, of each of the plurality of distributed units 302. In embodiments, the carrier aggregation configuration is determined based on RAN usage data and user device priority groupings received by the RRC controller 226. For example, a user device priority grouping may be based on whether a user device is connected to a private Wi-Fi or a public Wi-Fi access node. In some embodiments, the user device priority grouping is based on the type of user device (e.g., a model and version of the user device, an IoT device having a higher priority over a non-IoT device, a stationary user device having a higher priority over a mobile user device). In some embodiments, the user device priority grouping is based on a particular service (e.g., voice over NR utilizing 5G Stand Alone architecture having a higher priority than video over NR). By determining the carrier aggregation configuration and providing it to the MAC scheduler 214, the RRC controller 226 thereby improves upon capacity spectrum efficiency at 314 associated with providing telecommunication services to user devices or use cases based on per-subscriber level network slicing service level agreement support that combines the MAC scheduling and RRC setting indicated by the RRC controller 226 (i.e., network slicing 312).

At 306, the RRC controller 226 can provide one or more determined serving cells via handover procedure for one or more user devices or use cases to the MAC scheduler 214, without having to use another network component, of each of the plurality of distributed units 302. For example, based on the RAN usage data received from the plurality of distributed units 302, the RRC controller 226 determines a handover procedure from one serving cell to another serving cell associated with the plurality of distributed units 302. In embodiments, the handover procedure is determined based on the packet loss RAN usage data of the determined target serving cell being below a threshold. In some embodiments, the handover procedure is determined based on the scheduling delay of the determined target serving cell being below a threshold. In some embodiments, the handover procedure is determined based on the scheduling delay and the packet loss of the determined target serving cell being lower than the scheduling delay and packet loss of the other serving cells. By determining the handover procedure for the target serving cell and providing it to the MAC scheduler 214, the RRC controller 226 thereby increases low latency spectrum efficiency at 316 associated with providing telecommunication services to user devices or use cases based on per-subscriber level network slicing service level agreement support that combines the MAC scheduling and RRC setting indicated by the RRC controller 226 (i.e., network slicing 312).

At 308, the RRC controller 226 can provide one or more determined serving cells via handover procedure for one or more user devices or use cases to the MAC scheduler 214, without having to use another network component, of each of the plurality of distributed units 302. For example, based on the packet loss and call drop RAN usage data received from the plurality of distributed units 302, the RRC controller 226 determines a handover procedure from one serving cell to another serving cell associated with the plurality of distributed units 302. In embodiments, the handover procedure is determined based on the packet loss and call drop rate RAN usage data of the determined target serving cell being below a threshold. In some embodiments, the handover procedure is determined based on the call drop volume RAN usage data of the determined target serving cell being below a threshold. In some embodiments, the call drop volume threshold of a serving cell is determined based on historical communication data for a particular time of day or for a particular event (e.g., a national holiday). Additionally or alternatively, the call drop volume threshold of a serving cell is determined based on receiving serving cell call drop data during non-real time and during a particular time range prior to determining the handover procedure. By determining the handover procedure using the call drop and packet loss RAN usage data, the RRC controller 226 can instruct the MAC scheduler 214 to provide IoT user devices particular handover procedures at 318 via per-subscriber level network slicing service level agreement support that combines the MAC scheduling and RRC setting indicated by the RRC controller 226 (i.e., network slicing 312).

At 310, the RRC controller 226 can provide MU-MIMO priority and SRS priority to the MAC scheduler 214, without having to use another network component, of each of the plurality of distributed units 302. For example, the RRC controller 226 can determine the MU-MIMO priority and SRS priority for a user device or use case based on the RAN usage data and the user device priority groupings. For example, the user device priority groupings can be based on user device capability reports corresponding to user devices associated with each of the plurality of distributed units 302. In embodiments, the SRS scheduling priority corresponds to a beamforming matrix for an MU-MIMO user device. In some embodiments, the SRS scheduling priority can be determined based on MU-MIMO beam overlap serving cells corresponding to the plurality of distributed units 302. In some embodiments, an aperiodic SRS can have a higher priority than a periodic SRS, or vice versa, based on the RAN usage data. In some embodiments, transmissions associated with a particular component carrier can have a higher priority than another component carrier (e.g., a primary component carrier having a higher priority than another component carrier). By determining the MU-MIMO priority and SRS priority and providing this to the MAC scheduler 214, the RRC controller 226 can instruct the MAC scheduler 214 to provide fixed wireless access devices the particular MU-MIMO priority and SRS priority at 320 via per-subscriber level network slicing service level agreement support that combines the MAC scheduling and RRC setting indicated by the RRC controller 226 (i.e., network slicing 312).

Example Flowchart

Figure 4:
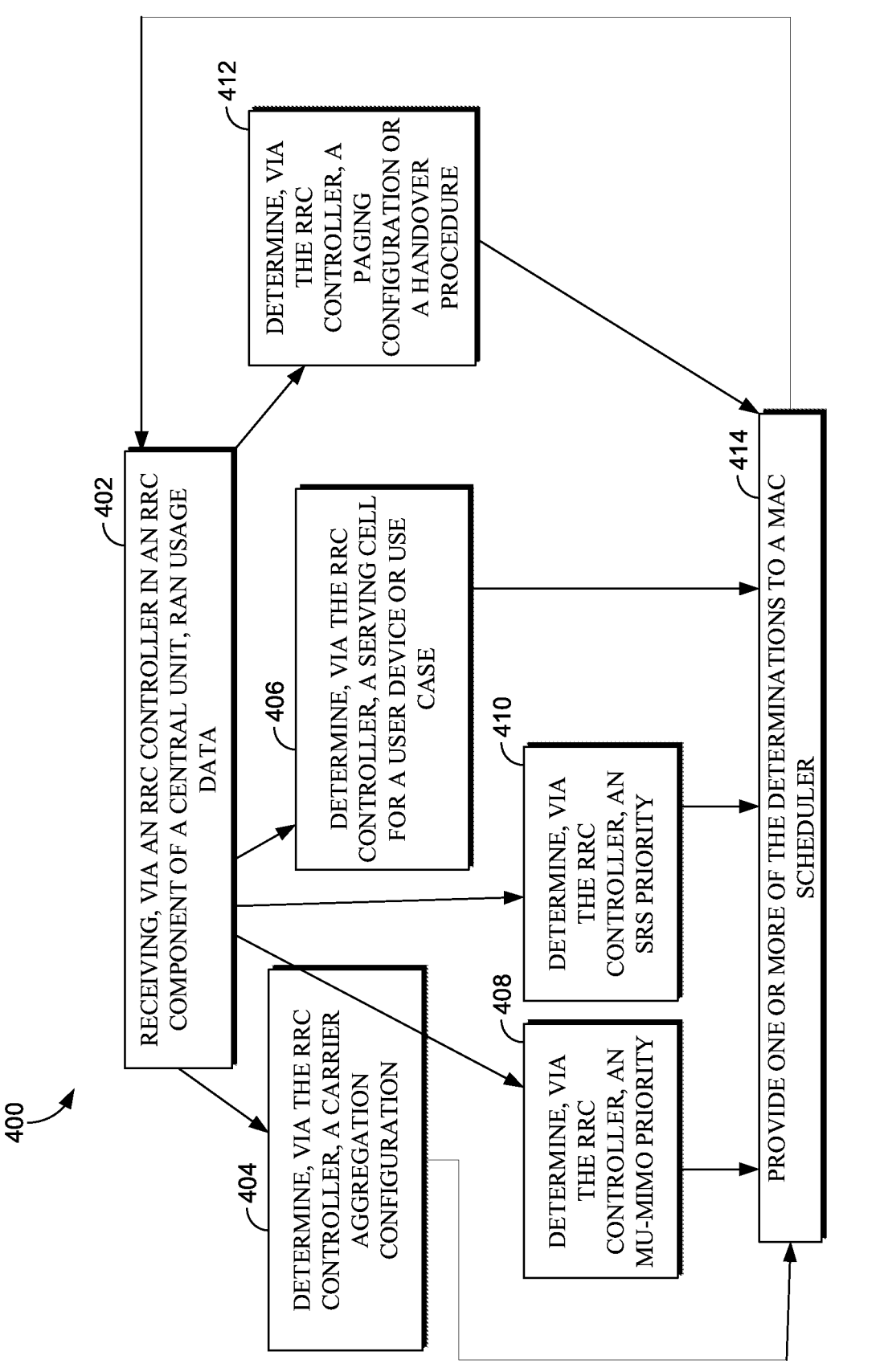
FIG. 4 illustrates an example flowchart for RRC controller operations, in accordance with embodiments herein.

Having described the example embodiments discussed above, an example flowchart 400 is described below with respect to FIG. 4. Example flowchart 400 begin at 402 with receiving, via an RRC controller in an RRC component of a central unit, RAN usage data corresponding to component carriers of different telecommunications service providers within a coverage area provided over a network (e.g., a core network). For example, RAN usage data can include a channel quality indicator and RAN usage statistics of the channel quality indicator, such as an average channel quality indicator or a time-averaged channel quality indicator. In embodiments, a base station or satellite configures a user device (e.g., via a MAC scheduler) to transmit channel quality indicator reports at a time interval. In embodiments, the RRC controller receives the RAN usage data from the user device, the base station, the satellite, or one or more combinations thereof. In an embodiment, the RRC controller receives a channel quality indicator report of historical channel quality indicators associated with the different telecommunications service providers, historical average channel quality indicators, historical time-averaged channel quality indicators, or one or more combinations thereof, from one or more user device generated reports.

In embodiments, the RAN usage data corresponds to channel state information resource signal elements associated with downlinks (e.g., from the base station or a satellite). The RAN usage data for the downlinks are associated with component carriers having at least one different telecommunications service provider. Further, the RAN usage data, in some embodiments, corresponds to a service cell of the coverage area. The coverage area can have a serving cell neighboring other serving cells, and one or more of those serving cells may be associated with a specific network provider, frequency band, or radio access technology. For example, a serving cell can be associated with an absolute radio frequency channel number, an enhanced radio frequency channel number, or another serving cell identifier. The serving cell can be associated with a portion of the coverage area. In one example embodiment, a serving cell is associated with a satellite providing network services to user devices within a portion of the coverage area. In another example, the serving cell is associated with one or more frequency bands or one or more particular radio access technologies.

In some embodiments, the RAN usage data can include a quality of service class identifier. For example, the QCI can define signal configurations for a layer (e.g., the physical layer). As another example, QCI can inform the physical layer about the QoS class of a transport block. In embodiments, a modulation and coding scheme can be used as a QCI for the physical layer. As another example, each carrier type (e.g., within a coverage area or a portion of the coverage area provided by one or more of a base station or satellite) can have a QCI assigned by the network. In some embodiments, the QCI has a weight based on a user device capability or an amount of traffic within a portion of the coverage area corresponding to a base station or satellite.

In some embodiments, the QoS class can be associated with information received from a base station or satellite. In embodiments, the QoS class can be associated with communication links between a base station or satellite and user device. In some embodiments, the QoS class can be associated with a type of network component (e.g., an eMBB). In some embodiments, the QoS class can be associated with one or more transmission parameters. In some embodiments, the QoS class can define one or more slot structures. In some embodiments, the QoS class can be associated with a background application, interactive content (e.g., payload content and web browsing), streaming (e.g. video streaming), a voice application, or another application type associated with an application server.

In some embodiments, the RAN usage data includes packet loss (e.g., a number of lost packets) or packet loss rate (e.g., a ratio of a number of packets lost to a total number of packets transmitted). In some embodiments, the packet loss corresponds to packet loss during a handover procedure. In some embodiments, the packet loss can correspond to one or more network components, such as a router for example. In embodiments, the packet loss can be monitored in real time or during a particular period of time within a day. In embodiments, packet loss averages can be determined for one or more network components during the particular period of time within the day (e.g., a period of time on a Tuesday for each Tuesday of a month for a number of months). In embodiments, a first packet loss rate is determined for a first component carrier of a first telecommunications service provider and a second packet loss rate is determine for a second component carrier of a second telecommunications service provider. In embodiments, one packet loss rate of a plurality of packet loss rates is above a threshold.

In embodiments, the RAN usage data includes resource usage data, such as traffic data volume during a period of time (e.g., during an event). For example, the resource usage data can be received from one or more nodes of a base station or satellite. In some embodiments, resource usage data includes an available amount of storage resources associated with the network, capabilities of one or more processing resources of the network, usage of one or more of the processing resources of the network, resource usage data associated with requested tasks, resource usage data associated with one or more software services (e.g., software as a service with provider applications running on a cloud infrastructure, platform as a service deployed on a cloud infrastructure, infrastructure as a service), one or more resource allocations associated with a frequency bandwidth or a physical resource block, resource allocation associated with a frequency or time, another type of resource usage data, or one or more combinations thereof.

In some embodiments, the RAN usage data includes a scheduling delay. In some embodiments, the scheduling delay is associated with an uplink or downlink. For example, the scheduling delay can be between receiving a control channel slot and a PDSCH. For instance, downlink control channel information may indicate that one or more slots will receive a PDSCH after receiving a control channel. In some embodiments, the scheduling delay is associated with a delay between receiving the control channel and a PUSCH. In embodiments, the scheduling delay is determined by a user device for one or more frequency bandwidths and one or more monitoring periods. In some embodiments, the scheduling delay is associated with one or more processors of the physical layer. In some embodiments, the scheduling delay corresponds to the packet arrival within a scheduler queue and the time in which it has been completely transmitted. Additionally, the scheduling delay can be based on how resource blocks have been organized, a number of resource blocks assigned to a user device, the time for assigning a single resource block, an availability of one or more resource blocks, or one or more combinations thereof.

In some embodiments, the RAN usage data includes a call drop rate. In embodiments, the call drop rate corresponds to a serving cell having different telecommunication service providers or component carriers having different telecommunication service providers. In some embodiments, the call drop rate can correspond to a primary component carrier, a secondary component carrier, another type of component carrier, or one or more combinations thereof. Call drop rate thresholds can be determined for a sector or component carrier based on historical communication data for a particular time of day or for a particular event (e.g., a national holiday). In some embodiments, the call drop rate received corresponds to a retainability KPI. In some embodiments, the RAN usage data received includes a portion of the call drop rate that is during a handover procedure.

Other RAN usage data received may also include QoS measurements of an average user device throughput indicative of network performance of the network or a portion thereof, a handover fail rate associated with a serving cell or a frequency band of a telecommunications service provider, one or more RSRPs, one or more PDCCH interference values, another type of RAN usage data, or one or more combinations thereof. In some embodiments, the RAN usage data corresponds to a distributed unit of the network, a central unit of the network, or one or more combinations thereof. In embodiments, the RAN usage data is stored at one or more storage resources of the network that is accessible by the RCC controller.

At 404, the RRC controller determines a carrier aggregation configuration for at least one user device or use case based on the RAN usage data. For example, the carrier aggregation configuration can be determined based on one or more of the a channel quality indicator, RAN usage statistics of the channel quality indicator, quality of service class identifier, packet loss, resource usage data, scheduling delay, call drop rate, another RAN usage data, or one or more combinations thereof. The component carriers of the carrier aggregation may be a set of radio frequency spectrum resources having a physical layer structure for supporting communications over a communication link (e.g., a portion of a radio frequency spectrum band operating according to a physical layer channel for a radio access technology. In embodiments, a component carrier is associated with a pre-defined frequency channel and positioned according to a channel raster. A component carrier can be an uplink or downlink (e.g., in FDD mode) or an uplink and a downlink (e.g., in TDD mode). In some embodiments, a component carrier of the carrier aggregation configuration is a low frequency band (e.g., 600 MHZ) and another component carrier of the carrier aggregation configuration is a high frequency band (e.g., 4 GHZ, greater than 4 GHZ, an mmWave). In some embodiments, a component carrier of the carrier aggregation configuration utilizes an unlicensed or shared radio frequency spectrum. In some embodiments, the carrier aggregation configuration is also based on a user device determined reference timing unit of each of the available component carriers. In some embodiments, the carrier aggregation configuration is also based on one or more of an RSRP, channel quality indicator, RSRQ, and a serving cell identifier of each of the available component carriers. In some embodiments, the carrier aggregation configuration is further determined based on an absolute radio frequency channel number, an enhanced radio frequency channel number, or another frequency band identifier.

The RRC controller can also determine other carrier aggregation configurations for other user devices or use cases based on the RAN usage data including RAN usage data for component carriers associated with other telecommunications service providers and various frequency bands. In some embodiments, the determined carrier aggregation configurations can correspond to multiple component carriers of different radio access technologies. In some embodiments, the RRC controller determines an intra-band carrier aggregation configuration (e.g., having component carriers in the same frequency band), an inter-band carrier aggregation configuration (e.g., having two or more component carriers that do not having overlapping frequency domains), or one or more combinations thereof. In some embodiments, a determined carrier aggregation configuration can be used with both FDD and TDD component carriers.

At 406, the RRC controller determines a serving cell, corresponding to the base station (e.g., an antenna array of the base station), satellite, or another network access node, for the user device or use case based on the received RAN usage data. For example, the RRC controller can determine the servicing cell based on interference data from each of a plurality of serving cells of multiple base stations or satellites. In embodiments, the serving cell interference data can be received by the RRC controller (e.g., from user devices communicating with each serving cell) via channel state information reporting. In some embodiments, a user device within a serving cell can receive reference signal identifiers from the serving cell or from another overlapping serving cell and transmit reference signals to the base station or satellite for determining the serving cell in addition to the RAN usage data. In some embodiments, the RRC controller determines the serving cell based on the serving cell interference data being below the threshold. In some embodiments, the RRC controller determines the serving cell based on the serving cell interference data (e.g., the reference signals received based on the reference signal identifiers) being lower than other serving cell interference data of the other serving cells.

Additionally or alternatively, in some embodiments, the RRC controller can determine the serving cell for one or more user devices based on the RAN usage data associated with a plurality of serving cells and location data of the one or more user devices. In embodiments, the location data may be determined using triangulation and one or more access nodes, such as one or more antennas of the base station or satellite, or a Wi-Fi access point. In embodiments, the location data may include a latitude, longitude, geocode, altitude, course, direction, heading, date, time, speed (e.g., of an IoT vehicle or the speed at which the user device is traveling within a motorized vehicle), other location data, or one or more combinations thereof. In embodiments, the location data includes location data from indoor positioning systems (e.g., RFID tags, indoor beacons or transmitters, Wi-Fi access points, one or more small cells). In some embodiments, the location data includes user device measurements of a reference signal time difference between a position reference signal, a cell specific reference signal, a tracking reference signal, and variations thereof. Additionally or alternatively, the location data can include time of arrival data associated with one or more of the position reference signal, cell specific reference signal, and tracking reference signal. In embodiments, the location data can include a civic location (e.g., postal address).

At 408, the RRC controller determines an MU-MIMO priority. For example, the MU-MIMO priority can correspond to a number of MIMO layers or a type of MIMO layer that a user device or use case receives based on the MU-MIMO priority. In some embodiments, the MU-MIMO priority is based on the user device capabilities associated with reading a layer RRC parameter (e.g., from a user device capability report). In embodiments, the MU-MIMO priority is determined based on the RAN usage data and user device priority groupings. In some embodiments, the user device priority grouping is based on the user device having a higher priority than other user devices within a serving cell. For example, the higher priority can be based on a type of the user device (e.g., a model or version of the user device). In some embodiments, the user device priority grouping is based on a user device subscription (e.g., a service subscription that enables the user device to engage in the service). In some embodiments, the MU-MIMO priority can also be determined based on location data of the user device. By determining the MU-MIMO priority providing this to the MAC scheduler, the RRC controller can instruct the MAC scheduler to provide fixed wireless access devices the particular MU-MIMO priority via per-subscriber level network slicing service level agreement support that combines the MAC scheduling and RRC setting indicated by the RRC controller (i.e., network slicing).

At 410, the RRC controller determines an SRS scheduling priority for one or more user devices or use cases based on the user device priority groupings and the RAN usage data. In embodiments, the RRC controller uses the SRS scheduling priority for selection of a beamforming matrix for an MU-MIMO user device. In embodiments, the RRC controller uses the SRS scheduling priority for selection of a sub-band in which SRS signals are transmitted to or from the user device. For example, some user devices can have a higher SRS scheduling priority for a particular beamforming matrix or for a particular sub-band. In some embodiments, the SRS scheduling priority can be determined based on MU-MIMO beam overlap between user devices. For example, a user device having a particular MU-MIMO beam overlap may have a lower SRS scheduling priority than a user device without MU-MIMO beam overlap. In some embodiments, the SRS scheduling priority can be determined based on user device location data. By determining the SRS priority and providing this to the MAC scheduler, the RRC controller can instruct the MAC scheduler to provide fixed wireless access devices the particular MU-MIMO priority via per-subscriber level network slicing service level agreement support that combines the MAC scheduling and RRC setting indicated by the RRC controller (i.e., network slicing).

At 412, the RRC controller determines a paging configuration or a handover procedure based on the RAN usage data. In some embodiments, the handover procedure or paging configuration is based on the determined serving cell for the user device or use case. In some embodiments, the paging configuration or handover procedure are also determined based on co-channel interference data associated with overlapping coverage areas of two or more adjacent nodes (e.g., nodes deploying an overlapping wireless air interface) using the same frequency band or sub-band. In some embodiments, the co-channel interference data is associated with serving cell access nodes of one or more base stations transmitting downlink signals to user devices. In embodiments, the handover procedure (e.g., from one base station to another base station) may include a tunneling between a user plane function and a base station associated with a path switch preparation request. In some embodiments, the handover procedure is based on a sequence number status transfer message. In some embodiments, the handover procedure is an intra-RAT handover procedure. In some embodiments, the handover procedure is further determined based on Evolved Packet System bearer information mapped to the RAN usage data. In some embodiments, the handover procedure has a target of approximately zero millisecond handover interruption latency (e.g., for a ultra-reliable low latency communication application) or a reduced handover ping-pong. In some embodiments, the paging configuration includes one or more instructions for a user device to monitor for a base station paging. In some embodiments, the paging configuration includes one or more sub-frames or downlink slot locations. In some embodiments, the paging configuration includes one or more paging gaps associated with a paging sweep. In some embodiments, additional RAN usage data can be received based on the paging configuration or the handover procedure provided to the MAC scheduler.

At 414, one or more of the determined carrier aggregation configuration, serving cell, MU-MIMO priority, SRS priority, other determination, or one or more combinations thereof, can be provided by the RRC controller to the MAC scheduler for the user device or use case. The RRC controller can directly provide the MAC scheduler the one or more determinations without having to utilize another network component of the central unit or another network component of the distributed unit. Further, upon providing one or more of these determinations to the MAC scheduler, the RRC controller can receive additional RAN usage data associated with one or more of the carrier aggregation configuration, serving cell, MU-MIMO priority, SRS priority, other determination, or one or more combinations thereof, provided to the MAC scheduler. For example, in some embodiments, the RRC controller receives additional RAN usage data, such as an additional packet loss corresponding to one or more network components and a component carrier, an additional packet loss corresponding to a different component carrier of a different radio access technology, an additional call drop rate associated with a particular handover procedure, an additional call drop rate associated with a paging configuration, a scheduling delay associated with the determined carrier aggregation configuration for the user device or use case, another type of additional RAN usage data, or one or more combinations thereof.

In embodiments, one or more of the determined carrier aggregation configuration, serving cell, MU-MIMO priority, SRS priority, other determination, or one or more combinations thereof, can be redetermined based on the additional RAN usage data. For example, the RRC controller can re-determine a serving cell or carrier aggregation configuration for a user device or use case based on receiving one or more additional time-averaged channel quality indicators corresponding to the component carriers of the carrier aggregation configuration, a quality of service class identifier (e.g., wherein the QoS class is associated with streaming or a voice application that is different from the initially received QCI, or wherein the QoS class is associated with a different network component type than the initially received QCI), a packet loss (e.g., one or more packet loss averages determined for the same network component as the initially received pack loss), a resource usage, a scheduling delay, a call drop rate, another additional RAN usage data, or one or more combinations thereof. As such, one or more of the re-determinations can also be transmitted by the RRC controller to the MAC scheduler.

Example User Device

Having described the example embodiments discussed above of the presently disclosed technology, an example operating environment of an example user device (e.g., user device 102A of FIG. 1) is described below with respect to FIG. 5. User device 500 is but one example of a suitable computing environment, and is not intended to suggest any particular limitation as to the scope of use or functionality of the technology disclosed. Neither should user device 500 be interpreted as having any dependency or requirement relating to any particular component illustrated, or a particular combination of the components illustrated in FIG. 5.

Figure 5:
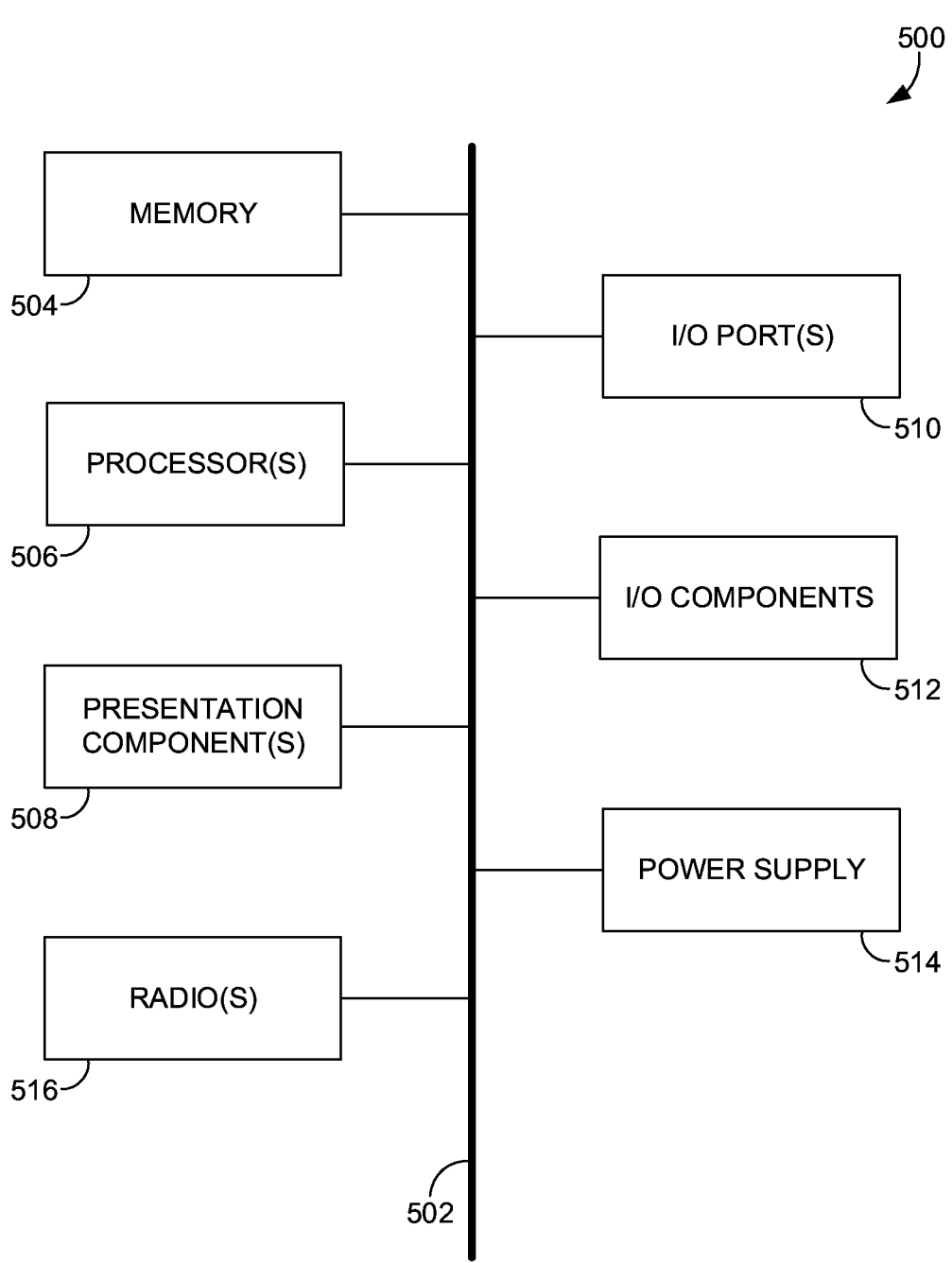
FIG. 5 depicts an example user device suitable for use in implementations of the present disclosure, in accordance with embodiments herein.

As illustrated in FIG. 5, example user device 500 includes a bus 502 that directly or indirectly couples the following devices: memory 504, one or more processors 506, one or more presentation components 508, one or more input/output (I/O) ports 510, one or more I/O components 512, a power supply 514, and one or more radios 516.

Bus 502 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component, such as a display device, to be an I/O component. Also, processors have memory. Accordingly, FIG. 5 is merely illustrative of an exemplary user device that can be used in connection with one or more embodiments of the technology disclosed herein.

User device 500 can include a variety of computer-readable media. Computer-readable media can be any available media that can be accessed by user device 500 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 504 includes computer storage media in the form of volatile and/or nonvolatile memory. The memory 504 may be removable, non-removable, or a combination thereof. Example hardware devices of memory 504 may include solid-state memory, hard drives, optical-disc drives, other hardware, or one or more combinations thereof. As indicated above, the computer storage media of the memory 504 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 500, or one or more combinations thereof.

The one or more processors 506 of user device 500 can read data from various entities, such as the memory 504 or the I/O component(s) 512. The one or more processors 506 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 506 can execute instructions, for example, of an operating system of the user device 500 or of one or more suitable applications.

The one or more presentation components 508 can present data indications via user device 500, another user device, or a combination thereof. Example presentation components 508 may include a display device, speaker, printing component, vibrating component, another type of presentation component, or one or more combinations thereof. In some embodiments, the one or more presentation components 508 may comprise one or more applications or services on a user device, across a plurality of user devices, or in the cloud. The one or more presentation components 508 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 510 allow user device 500 to be logically coupled to other devices, including the one or more I/O components 512, some of which may be built in. Example I/O components 512 can include a microphone, joystick, game pad, satellite dish, scanner, printer, wireless device, and the like. The one or more I/O components 512 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 508 on the user device 500. In some embodiments, the user device 500 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 500 may, additionally or alternatively, be equipped with accelerometers or gyroscopes that enable detection of motion. In some embodiments, the output of the accelerometers or gyroscopes may be provided to the one or more presentation components 508 of the user device 500 to render immersive augmented reality or virtual reality.

The power supply 514 of user device 500 may be implemented as one or more batteries or another power source for providing power to components of the user device 500. In embodiments, the power supply 514 can include an external power supply, such as an AC adapter or a powered docking cradle that supplements or recharges the one or more batteries. In aspects, the external power supply can override one or more batteries or another type of power source located within the user device 500.

Some embodiments of user device 500 may include one or more radios 516 (or similar wireless communication components). The one or more radios 516 can transmit, receive, or both transmit and receive signals for wireless communications. In embodiments, the user device 500 may be a wireless terminal adapted to receive communications and media over various wireless networks. User device 500 may communicate using the one or more radios 516 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 516 may facilitate communication via radio frequency signals, frames, blocks, transmission streams, packets, messages, data items, data, another type of wireless communication, or one or more combinations thereof. The one or more radios 516 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A radio resource control (RRC) controller for network slicing, the RRC controller comprising:

one or more processors; and computer memory storing computer-usable instructions that, when executed by the one or more processors, cause the RRC controller to perform operations comprising:

receiving, via the RRC controller, radio access network (RAN) usage data for a plurality of component carriers corresponding to a base station;

determining, via the RRC controller, a carrier aggregation configuration for at least one user device based on the RAN usage data;

providing, via the RRC controller, the carrier aggregation configuration to a medium access control (MAC) scheduler, receiving, via the RRC controller, co-channel interference data for at least two frequency channels corresponding to the base station;

determining, via the RRC controller, a handover procedure for the at least one user device based on the co-channel interference data and the RAN usage data; and providing, via the RRC controller, the handover procedure to the MAC scheduler.

2. The system according to claim 1, wherein the RAN usage data includes including a time-averaged channel quality indicator, a quality of service class identifier, a packet loss, a resource usage, and a scheduling delay.

3. The system according to claim 1, the operations further comprising:

receiving, via the RRC controller, user device priority groupings;

determining, via the RRC controller, a multi-user multiple-input multiple-output priority and a sounding reference signal scheduling priority for the at least one user device based on the user device priority groupings and the RAN usage data; and providing, via the RRC controller, the multi-user multiple-input multiple-output priority and the sounding reference signal scheduling priority to the MAC scheduler.

4. The system according to claim 1, wherein the RAN usage data includes a time-averaged channel quality indicator and a quality of service class identifier, the operations further comprising:

determining, via the RRC controller, a second carrier aggregation configuration for another user device based on the RAN usage data; and providing, via the RRC controller, the second carrier aggregation configuration to the MAC scheduler.

5. The system according to claim 1, the operations further comprising:

determining, via the RRC controller, a paging configuration for the at least one user device based on the RAN usage data;

providing, via the RRC controller, the paging configuration to the MAC scheduler;

receiving, via the RRC controller, additional RAN usage data based on the paging configuration provided to the MAC scheduler;

redetermining, via the RRC controller, the carrier aggregation configuration for the at least one user device based on the additional RAN usage data; and providing, via the RRC controller, the redetermined carrier aggregation configuration to the MAC scheduler.

6. The system according to claim 1, wherein the RAN usage data includes a packet loss and a scheduling delay corresponding to at least one of the plurality of component carriers, the operations further comprising:

determining, via the RRC controller, a handover procedure associated with at least one serving cell for the at least one user device based on the packet loss and the scheduling delay; and providing, via the RRC controller, the handover procedure to the MAC scheduler.

7. The system according to claim 1, wherein the RAN usage data includes a packet loss and a call drop rate corresponding to at least one of the plurality of component carriers, the operations further comprising:

determining, via the RRC controller, a handover procedure associated with at least one serving cell for the at least one user device based on the packet loss and the call drop rate;

providing, via the RRC controller, the handover procedure to the MAC scheduler; and receiving additional RAN usage data including an additional packet loss and an additional call drop rate based on providing the handover procedure to the MAC scheduler.

8. A method for utilizing a radio resource control (RRC) controller for network slicing, the method comprising:

receiving, via the RRC controller, radio access network (RAN) usage data for component carriers corresponding to a base station;

determining, via the RRC controller, a carrier aggregation configuration for a user device based on the RAN usage data;

determining, via the RRC controller, at least one serving cell, corresponding to the base station, for the user device based on the RAN usage data;

providing, via the RRC controller, the carrier aggregation configuration and the at least one serving cell to a medium access control (MAC) scheduler for the user device, receiving, via the RRC controller, user device priority groupings, based on a user device subscription, for a plurality of user devices including the user device;

determining, via the RRC controller, a multi-user multiple-input multiple-output priority and a sounding reference signal scheduling priority for each of the plurality of user devices based on the user device priority groupings and the RAN usage data; and providing, via the RRC controller, the multi-user multiple-input multiple-output priority and the sounding reference signal scheduling priority or each of the plurality of user devices to the MAC scheduler.

9. The method according to claim 8, the operations further comprising:

receiving location data for the user device;

determining, via the RRC controller, a paging configuration for the user device based on the RAN usage data and the location data;

providing, via the RRC controller, the paging configuration to the MAC scheduler;

receiving, via the RRC controller, additional RAN usage data corresponding to a plurality of base stations and including a time-averaged channel quality indicator, a quality of service class identifier, a packet loss, a resource usage, a scheduling delay, and a call drop rate, the additional RAN usage data received based on the paging configuration provided to the MAC scheduler;

redetermining, via the RRC controller, the at least one serving cell for the user device based on the additional RAN usage data; and providing, via the RRC controller, the redetermined serving cell to the MAC scheduler.

10. The method according to claim 8, the operations further comprising:

receiving, via the RRC controller, RAN usage data for component carriers corresponding to a plurality of base stations including the base station;

determining, via the RRC controller, a second carrier aggregation configuration for a second user device based on the RAN usage data;

determining another serving cell for the second user device based on the RAN usage data for the component carriers corresponding to the plurality of base stations; and providing, via the RRC controller, the second carrier aggregation configuration and the other serving cell to the MAC scheduler for the second user device.

11. The method according to claim 8, wherein the RAN usage data includes a time-averaged channel quality indicator, a quality of service class identifier, a packet loss, a resource usage, and a scheduling delay, the operations further comprising:

determining, via the RRC controller, a handover procedure associated with the at least one serving cell for the user device based on the time-averaged channel quality indicator, the quality of service class identifier, the packet loss, the resource usage, and the scheduling delay; and providing, via the RRC controller, the handover procedure to the MAC scheduler.

12. The method according to claim 8, the operations further comprising:

receiving, via the RRC controller, serving cell interference data associated with at least one of the component carriers corresponding to the at least one serving cell and the carrier aggregation configuration;

determining that the serving cell interference data is below a threshold; and determining, via the RRC controller, the at least one serving cell based on the serving cell interference data being below the threshold.

13. One or more non-transitory computer storage media having computer-executable instructions embodied thereon, that when executed by at least one processor, cause the at least one processor to perform a method comprising:

receiving, via the RRC controller, radio access network (RAN) usage data for component carriers corresponding to each of a plurality of neighboring serving cells;

receiving, via the RRC controller, location data for a user device;

determining, via the RRC controller, a serving cell of the plurality of neighboring serving cells for the user device based on the RAN usage data and the location data, wherein the RAN usage data used to determine the serving cell for the user device includes a call drop rate corresponding to each of the component carriers;

determining, via the RRC controller, a carrier aggregation configuration for the user device based on the serving cell, the RAN usage data, and the location data;

causing the RRC controller to provide the carrier aggregation configuration and the serving cell to a medium access control (MAC) scheduler for the user device, determining, via the RRC controller, that the call drop rate for a primary component carrier of the component carriers is lower than each of the other primary component carriers of the component carriers; and determining, via the RRC controller, the carrier aggregation configuration for the user device based on the call drop rate for the primary component carrier of the component carriers being lower than each of the other primary component carriers of the component carriers.

14. The one or more non-transitory computer storage media of claim 13, wherein the RAN usage data includes a scheduling delay corresponding to each of the component carriers, and wherein the method further comprises:

determining, via the RRC controller, that the scheduling delay one of the component carriers is lower than each of the other component carriers; and determining, via the RRC controller, the carrier aggregation configuration for the user device based on the scheduling delay for the one of the component carriers being lower than each of the other component carriers.

15. The one or more non-transitory computer storage media of claim 13, the method further comprising:

receiving, via the RRC controller, serving cell interference data for each of the plurality of neighboring serving cells;

determining, via the RRC controller, that the serving cell interference data for the serving cell is lower than each of the serving cell interference data for the plurality of neighboring serving cells; and determining, via the RRC controller, the serving cell based on the serving cell interference data for the serving cell being lower than each of the serving cell interference data for the plurality of neighboring serving cells.

16. The one or more non-transitory computer storage media of claim 13, wherein the RAN usage data includes a time-averaged channel quality indicator and a quality of service class identifier, and wherein the method further comprises:

determining, via the RRC controller, that the user device is being served by another serving cell of the plurality of neighboring serving cells;

based on the user device being served by another serving cell, determining, via the RRC controller, a handover procedure for the user device from the other serving cell to the serving cell, the handover procedure based on the time-averaged channel quality indicator and the quality of service class identifier associated with the serving cell; and providing, via the RRC controller, the handover procedure to the MAC scheduler.

17. The one or more non-transitory computer storage media of claim 16, wherein the RAN usage data includes a packet loss, a resource usage, a scheduling delay, and a call drop volume, and wherein the handover procedure is based on the packet loss, the resource usage, the scheduling delay, and the call drop volume.

\* \* \* \* \*